March 1, 1966  R. T. WEBBER ETAL  3,238,021

MIXING EQUIPMENT

Filed Jan. 21, 1963　　　　　　　　　　　　　　　2 Sheets-Sheet 1

ROBERT T. WEBBER
CARL P. SCHUMACHER
INVENTORS

BY
ATTORNEY

March 1, 1966 R. T. WEBBER ETAL 3,238,021
MIXING EQUIPMENT
Filed Jan. 21, 1963 2 Sheets-Sheet 2

ROBERT T. WEBBER
CARL P. SCHUMACHER
INVENTORS

BY *J.J. Henochke*
ATTORNEY

United States Patent Office

3,238,021
Patented Mar. 1, 1966

3,238,021
MIXING EQUIPMENT
Robert T. Webber, Creve Coeur, and Carl P. Schumacher, Kirkwood, Mo., assignors to Monsanto Company, a corporation of Delaware
Filed Jan. 21, 1963, Ser. No. 252,945
7 Claims. (Cl. 23—259.1)

The present application is a continuation-in-part of our copending application, Serial No. 208, filed January 4, 1960 and now abandoned.

This invention relates to methods and apparatus for mixing fluids. More particularly, the invention relates to methods and apparatus suitable for quickly and effectively mixing fluids having high heats of solution and/or reaction, where at least one of the components of the mixed fluid is a relatively volatile material.

In many instances, it is desirable to mix together two or more fluids having heats of solution and/or reaction such that provision must be made for extensive cooling if one is to avoid undesirable losses of reagents. For example, in the manufacture and utilization of liquid fertilizers, there is a substantial demand for liquid solutions containing high concentrations of nitrogen and phosphorus, such as can be obtained by mixing together water, ammonia and phosphoric acid. Phosphoric acid and ammonia each generate rather large amounts of heat when dissolved in water, and phosphoric acid and ammonia have a rather high heat of reaction when reacted together. Consequently, the combined mixing and reacting of large quantities of phosphoric acid, ammonia and water is not a simple matter because of the problem of removing heat fast enough to allow a reasonable rate of mixing of the ingredients.

According to this invention, there is provided apparatus for rapidly mixing fluids, which apparatus comprises means for maintaining a flowing tube of at least one liquid and means for introducing at least one other fluid interiorly of said flowing tube. Preferably, the rate of movement of the liquid or liquids in said tube is sufficient to result in turbulent flow, as contrasted to laminar flow, and for this reason and the reason that it provides excellent liquid-vapor contact, it is generally advantageous to force the liquid or liquids in said tube to follow a helical path. If substantial heat is generated within the mixing chamber, the apparatus permits the use of an excess of volatile liquid material, such as water, and the excess heat can be dissipated in the formation of vapor. For this reason, it is also generally advantageous for the apparatus to include a centrifugal separator or other means for separating from the liquid product the vapor which may be generated.

Apparatus according to this invention, particularly when employed for mixing ammonia, phosphoric acid and water, has numerous advantages. A first such advantage is that the mixing rate can be maintained at a satisfactory level even when employing anhydrous ammonia, and, for example, a mixing rate of about 20 to 30 tons per hour using anhydrous ammonia and concentrated phosphoric acid can be achieved in accordance with this invention. Previously available apparatus for continuously mixing ammonia, phosphoric acid and water has, in all known instances, required the use of aqueous ammonia for operation at a satisfactory rate. Even with batch-type apparatus, it has been necessary to retain the mixing rate below about 10 tons per hour when using anhydrous ammonia, and because of this, an aqueous solution of ammonia, rather than anhydrous ammonia, also has been generally employed with this type of apparatus. The use of aqueous ammonia is undesirable for the reason that it requires the shipment of large quantities of material or else requires aparatus for conducting one or more preliminary mixing operations.

Another important advantage of the apparatus of this invention for mixing ammonia, phosphoric acid and water is that high mixing rates can be achieved without excessive ammonia loss and, in fact, the loss of ammonia can be less than about 1% by weight with apparatus according to this invention. This is possible because the apparatus provides such excellent liquid-vapor contact that the ammonia vapor introduced into or generated within the mixing chamber is completely reacted or largely sorbed before the liquid or liquids are withdrawn and collected. Still another advantage is that the apparatus can be so compactly and lightly constructed as to be readily portable on a truck or the like, thus reducing the number of installations required.

The invention will be more readily understood by reference to the detailed description of specific embodiments thereof together with the drawing, wherein.

Figure 1:
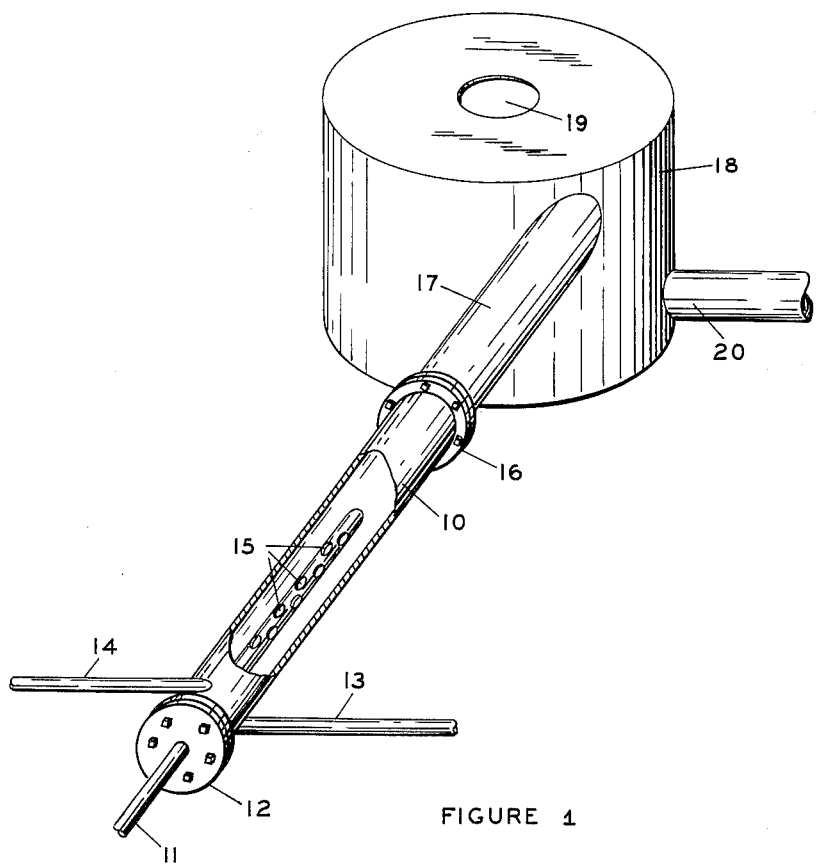
FIGURE 1 is a perspective view, partially in section, illustrating one embodiment of the present invention.

Referring to FIGURE 1 of the drawing, the apparatus comprises a generally cylindrical mixing zone enclosure 10 into which there is inserted a perforated pipe 11 through a face plate 12 which otherwise closes one end of the enclosure 10. Pipe 11 terminates in a closed end within chamber 10. Two liquid supply pipes 13 and 14 are oppositely disposed with respect to enclosure 10 and are operatively connected with the enclosure in such a way that fluids introduced through the pipes 13 and 14 enter enclosure 10 in a generally tangential flow with respect to the space between enclosure 10 and perforated pipe 11. Together pipes 11, 13 and 14 and enclosure 10 provide a means for forming and maintaining a tube of liquid in which the liquid is flowing in a helical path so that the rate of movement of the liquid is greatly in excess of the rate at which the liquid axially traverses enclosure 10. The pipe 11, which is axially disposed with respect to the enclosure 10 and the flowing tube of liquid operatively present therein, is constructed with a plurality of perforations 15 so that it provides a tubular multiple orifice or sparger means for introducing a fluid to the internal surfaces of the flowing tube of liquid in an area remote from the open end of enclosure 10.

Enclosure 10 is attached through a flanged connection 16 and a pipe 17 to a centriugal liquid-vapor separator 18. Pipe 17 can be of the same or different diameter as enclosure 10, and is provided with flow-resisting means which causes flooding of and increased back pressure in the tubular enclosure 10. The flow-retarding means will be fully described hereinafter. Separator 18 can be of conventional construction and is provided with an opening 19 for the escape of vapor and a drain pipe 20 through which accumulated liquid can be withdrawn.

In utilizing the foregoing equipment, one or more liquids are introduced through pipes 13 and 14, and, because of the positioning of these pipes, the fluids thus introduced will have the same rotational direction of flow around pipe 11 in the annular space between enclosure 10 and pipe 11, and will follow a generally helical pattern of flow through the mixing device. At least one other fluid is introduced through pipe 11 and enters the mixing chamber through the perforations 15 in a generally radial direction. In operation, chamber 10 is substantially flooded due to the flow-retarding means positioned between it and separator 18.

The apparatus is particularly well suited for mixing together two or more fluids having high heats of solution and/or reaction because it provides for the dissipation of heat by the formation of vapor which can be allowed to escape. When a mixing operation of this type is to be conducted, it is generally preferable to introduce through the pipes 13 and 14 the liquids which are utilized in greatest volume, and this usually includes the liquid which is to provide the vapor that is allowed to escape. Introduction of the liquids employed in largest volume through the pipes 13 and 14 achieves a more turbulent flow in the helically flowing tube of liquid surrounding the pipe 11 so that a more rapid and thorough mixing is obtained. In view of these considerations, it will be seen that, when making liquid ammonium phosphate fertilizers, it is generally advantageous for the water of dilution and excess water to be evolved as vapor to be introduced through one of the pipes 13 or 14. The other of these two pipes can then suitably be employed for the introduction of phosphoric acid, and the pipe 11 can be employed for the introduction of ammonia. Generally, it is advantageous to employ the pipe 11 for the introduction of the component of the mixture utilized in smallest volume or which is highly volatile because this results in minimum disruption of the helical flow of liquids in the tubular mixing zone. Where flashing may occur, as in the introduction of anhydrous ammonia, or when the fluid as introduced is in the form of vapor, the fact that the vapor is almost completely surrounded by a turbulent tube of liquid insures rapid reaction or sorption so that reagent loss, other than steam, is held to a minimum.

The mixed fluids pass out of enclosure 10 and through line 17 into a liquid-vapor separator 18, wherein any volatile components which have been vaporized or otherwise separated from liquids are removed through opening 19, and the remaining liquid is removed through line 20.

Figure 2:
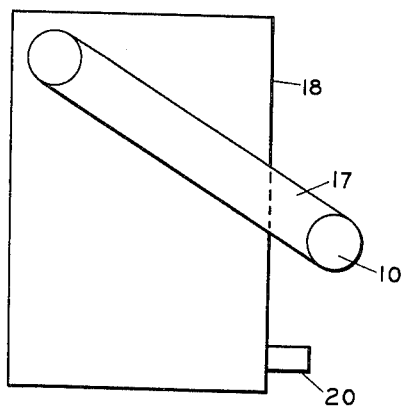
FIGURE 2 is a frontal schematic view of another embodiment of the invention.
Figure 3:
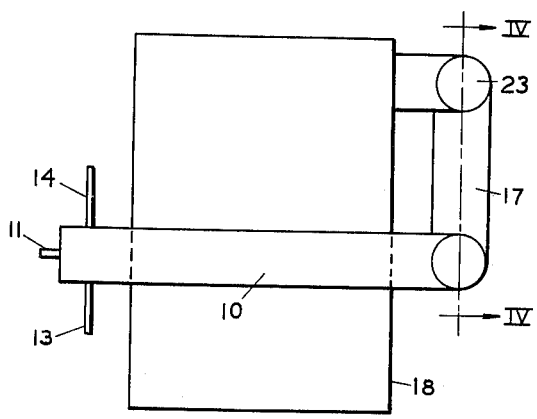
FIGURE 3 is a lateral schematic view of the embodiment of FIGURE 2.

As pointed out above, flow-resisting or flow-retarding means are positioned in fluid-flow relationship between tubular mixing zone 10 and separator 18. The particular physical configuration of such means is not significant. It is only necessary that they effect a retardation of liquids from chamber 10 and a flooding thereof. The preferred and most economically convenient method of providing the requisite flow-retarding means is to position member 17 in an inclined plane extending from the outlet of chamber 10 into the top of separator 18, as shown in FIGURES 2 and 3. Although, as shown in the drawing, the member 17 extends upwardly throughout its entire length between the reaction chamber and the separator, it will be readily appreciated that portions of this member can be horizontal, with the intervening portions being inclined upwardly.

Figure 4:
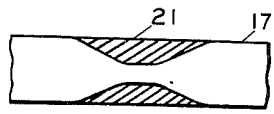
FIGURE 4 is a longitudinal sectional view taken along the line IV—IV of FIGURE 3.
Figure 5:
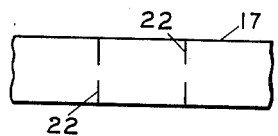
FIGURE 5 is also a longitudinal sectional view taken along line IV—IV of FIGURE 3, illustrating another modification of the invention.
Figure 6:
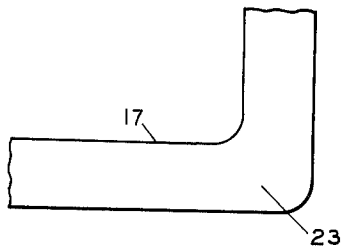
FIGURE 6 is a similar view illustrating an additional embodiment.

FIGURES 4, 5 and 6 of the drawing illustrate additional flow-retarding means that can be incorporated into the apparatus of the present invention. As shown in FIGURE 4, the flow-resisting means consist of an annular constriction 21. In FIGURE 5, the flow-resisting element comprises a pair of baffles 22. In FIGURE 6, the flow retardation is effected by providing element 17 with one or more angular portions such as shown at 23. For the sake of convenience, these internal flow-retarding or flow-resisting means are illustrated in connection with an upwardly inclined element 17. However, for the purposes of the present invention, the means shown in FIGURES 4, 5 and 6 can be used in horizontally extending conduits between the reaction chamber and the separator. Although each of these three figures of the drawing shows separate flow-retarding means, the apparatus of the present invention can be provided with a series of each means illustrated. Also, these means can be used in various combinations.

When using the foregoing equipment for mixing ammonia, phosphoric acid and water, the ammonia can be either liquid or gaseous ammonia, and, while it is a major advantage of the apparatus that anhydrous ammonia can be used, the apparatus will also perform satisfactorily using aqueous ammonia. Insofar as mixing and reacting are concerned, the concentration of ammonia in any mixture with water is of no significance but, as a practical matter, it will generally be desirable, if mixtures with water are to be used, to have the concentration of ammonia therein in excess of about 20 weight percent of ammonia. Phosphoric acid of any commercially available concentration can be employed. The proportions of phosphoric acid and ammonia utilized will generally be such that the weight ratio of nitrogen to $P_2O_5$ falls between about .25 and about .4, and preferably between about .30 and about .35.

The amount of water separately added in the above-described mixing process will depend to a considerable extent upon the concentration of nitrogen and phosphorus desired in the end product, as well as upon the amounts of water which may have been introduced along with the ammonia or acid (e.g., where one or both of these components were utilized as aqueous solution). The various proportions and conditions which can be used to obtain any particular desired ultimate composition can be readily calculated by persons having ordinary skill in the art by utilizing thermodynamic data available in the literature. Alternatively, the amounts and concentrations, as well as the rates of flow, of the various components required to produce any particular desired composition can be readily determined by simple trial and error methods.

The following is an example demonstrating the outstandingly effective operation of the present invention in the production of liquid fertilizer containing 8 weight percent N and 24 weight percent $P_2O_5$ (known in the fertilizer trade as an 8–24–0 fertilizer composition). In a unit constructed as described in the drawing and having a mixing enclosure only 4 inches in diameter and 4 feet long, the foregoing liquid fertilizer composition was produced at the rate of 3600 gallons per hour by introducing 705 gallons of anhydrous ammonia per hour, 1265 gallons of 75% $H_3PO_4$ per hour, and 2230 gallons of water per hour. The temperature of the liquids introduced was about 50° F.; the temperature of the liquid withdrawn from the liquid-vapor separator was about 210° F. As can be readily calculated from the foregoing figures, about .325 pound of steam was evolved per gallon of liquid fertilizer produced.

The present invention has been described in conjunction with certain preferred embodiments, and it will be understood that modifications and variations may be resorted to without departing from the spirit of the invention. The invention contemplates all such modifications and variations except as do not come within the appended claims.

The embodiments of the invention in which an exclusive property or privilege is claimed are defined as follows:

1. Apparatus for mixing a plurality of fluids comprising a first tubular member of substantially uniform internal diameter having a closed end and an oppositely disposed open end, a second tubular member having a perforate side wall and a closed end, said second tubular member being of smaller diameter and shorter length than the first tubular member, substantially concentric therewith and extending through the closed end of the first tubular member, the closed end and perforations of the second tubular member being within the first tubular member, a plurality of fluid inlet means entering the first tubular member substantially tangentially and in substantially the same circumferential direction, said fluid inlet means being proximate to and substantially equidistant from the closed end of the first tubular member, flow-resisting means external to and in fluid-flow relationship with the open end of the first tubular member to induce liquid flooding and increased back pressure within the first tubular member, and a centrifugal liquid-vapor separator in fluid-flow relationship with said flow-resisting means.

2. Apparatus for mixing exothermally reactive fluids which comprises a tubular reaction chamber of substantially uniform internal diameter having a closed end and an oppositely disposed open end, a centrifugal liquid-vapor separator, and an external flow-retarding means positioned between and in fluid-flow relationship with the reaction chamber and the separator to induce flooding and back pressure within the reaction chamber, a tubular perforate member closed at one end and substantially concentric with the tubular reaction chamber, the tubular member extending through the closed end of the reaction chamber to a point intermediate the ends thereof, and a plurality of fluid inlets entering the reaction chamber substantially tangentially and in substantially the same circumferential direction, the fluid inlets being proximate to and substantially equidistant from the closed end of the reaction chamber and from one another.

3. Apparatus according to claim 2, wherein the flow-retarding means comprises a conduit having at least one sharply angular turn.

4. Apparatus according to claim 2, wherein the flow-retarding means comprises a conduit having a portion extending vertically from the reaction chamber.

5. Apparatus according to claim 2, wherein the flow-retarding means comprises a conduit having, at least along a portion of its length, an internal diameter less than the internal diameter of the reaction chamber.

6. Apparatus according to claim 2, wherein the flow-retarding means comprises a conduit having at least one baffle therein.

7. Apparatus according to claim 2, wherein the flow-retarding means comprises a conduit having at least one constriction therein.

References Cited by the Examiner

UNITED STATES PATENTS

| | | | |
|---|---|---|---|
| 1,325,711 | 12/1919 | Chaplin | 23—168 |
| 2,755,176 | 7/1956 | Pearce et al. | 71—54 |
| 2,822,157 | 2/1958 | Porter | 261—124 |
| 2,890,929 | 6/1959 | Rummert | 23—284 |
| 2,902,342 | 9/1959 | Kerley | 71—43 |

FOREIGN PATENTS 1,020,605 12/1957 Germany.

MORRIS O. WOLK, *Primary Examiner.*

JAMES H. TAYMAN, JR., *Examiner.*